(12) United States Patent
Rudy

(10) Patent No.: US 6,189,811 B1
(45) Date of Patent: Feb. 20, 2001

(54) PORTABLE WATER-PUMPING SYSTEM

(76) Inventor: David Owen Rudy, 202 Sand St., Aptos, CA (US) 95003

( * ) Notice: Under 35 U.S.C. 154(b), the term of this patent shall be extended for 0 days.

(21) Appl. No.: 09/440,296

(22) Filed: Nov. 15, 1999

(51) Int. Cl.[7] ............................................. A01G 25/14
(52) U.S. Cl. ..................... 239/375; 239/525; 239/DIG. 3
(58) Field of Search .................................. 239/64, 67, 68, 239/136, 302, 337, 375, 525, 526, 529, DIG. 3

(56) References Cited

U.S. PATENT DOCUMENTS

| | | | |
|---|---|---|---|
| 3,760,982 | * 9/1973 | Haase ...................................... | 222/63 |
| 3,904,116 | * 9/1975 | Jones et al. ............................ | 239/127 |
| 4,563,727 | * 1/1986 | Curiel ..................................... | 362/183 |
| 4,810,169 | * 3/1989 | Kranzle .................................. | 417/63 |
| 4,878,359 | * 11/1989 | Mandell .................................. | 62/239 |
| 5,100,058 | * 3/1992 | Wei ........................................ | 239/273 |
| 5,220,269 | * 6/1993 | Chen et al. ............................. | 320/2 |
| 5,330,104 | 7/1994 | Marcus .................................. | 239/266 |
| 5,344,075 | * 9/1994 | Springer et al. ........................ | 239/70 |
| 5,395,052 | * 3/1995 | Schneider et al. ..................... | 239/154 |
| 5,569,998 | 10/1996 | Cowan .................................... | 320/21 |
| 5,814,906 | * 9/1998 | Spencer et al. ........................ | 307/150 |
| 5,975,423 | * 11/1999 | Rice et al. .............................. | 239/1 |

* cited by examiner

Primary Examiner—James Hook
Assistant Examiner—Jorge Bocaregra
(74) Attorney, Agent, or Firm—Richard B. Main

(57) ABSTRACT

A portable water-pumping system comprises a water-tight case with a hinged lid. A deep recess in the lid allows a photovoltaic array to be nested inside in a protected position. A gel-cell battery operates a high-pressure water-pump and both are carried inside the case. A trigger-operated water nozzle and a pressure switch allow automatic functioning of the water pump. A non-collapsible water-suction hose includes a strainer to prevent clogging of the pump. A cigarette-lighter power cord allows near-continuous and heavy use when a source of 12VDC power is available from a car, boat, plane, or other vehicle.

11 Claims, 1 Drawing Sheet

PORTABLE WATER-PUMPING SYSTEM

BACKGROUND OF THE INVENTION

1. Field of the Invention

The present invention relates to pumping systems, and more particularly to portable, battery-powered pumps that include solar-cells for photovoltaic recharging and water-proof cases suitable for use around a boat.

2. Description of Related Art

Water pumping and pressurized water are often needed far away from any available source of utility power. So it has become quite common for water pumps to be operated by gasoline motors, generators, and even batteries. Recent advances in photovoltaic device technology have also made it possible for rather modest solar arrays to affordably keep a bank of storage batteries fully charged for water pumping. Many water pumping applications do not require continual pumping, so batteries are used to supply the peak electrical demands and solar panels are used to charge them over the long-run. Such systems are very common in remote homes and aboard off-shore sailboats. A few, light-duty portable water pumping systems have even been marketed, but these generally do not provide the water pressures needed to scour a boat clean, or the volumes needed for other washing applications boaters may have. High pressure systems are needed to clean off-road vehicles and race cars before and after use.

For example, U.S. Pat. No. 5,330,104, issued Jul. 19, 1994, to David Marcus, describes and illustrates a portable outdoor mister that is housed in a box 12 with solar panels 50 on a lid 14. A battery 46 inside has a switch 66 to interrupt power from the solar panel 50 and another switch 64 to control a water pump motor 44. A suction line 18 draws-in water to a pump 42 inside the housing 12. An output hose 26 provides high pressure water. FIG. 1 of Marcus shows the system on-board a boat with the suction line drawing water from the body of water the -boat is floating on.

U.S. Pat. 5,569,998, issued Oct. 29, 1996, to Thomas Cowan, describes a solar water pumping system that uses 50–60 watt 12-volt photovoltaic panels. A storage battery 15 is connected through to a pump 18. A diode sensor 12 prevents back voltage flow from the battery to the solar panel 10 when there is no light. The battery is described as being preferably a lead-acid gel-type, and for a 10-watt photovoltaic panel 10, a 7-amp hour battery is appropriate. The motor and panels are sized so that the pump can run continuously during the day while sunlight is available. A DC-switcher type power supply 17 is used to deliver a constant 12–13.5 volts to the pump, no matter how discharged the battery becomes.

SUMMARY OF THE INVENTION

An object of the present invention is to provide a portable water-pumping system.

Another object of the present invention is to provide a portable pressure washer suitable for washing boats.

A further object of the present invention is to provide a portable water-pumping system with a recharging system that can operate in the field far away from common utility power.

Briefly, a portable water-pumping system embodiment of the present invention comprises a water-tight case with a hinged lid. A deep recess in the lid allows a photovoltaic array to be nested inside in a protected position. A gel-cell battery operates a high-pressure water pump and both are carried inside the case. A trigger-operated water nozzle and a pressure switch allow automatic functioning of the water pump. A non-collapsible water-suction hose includes a strainer to prevent clogging of the pump. A cigarette-lighter power cord allows near-continuous and heavy use when a source of 12VDC power is available from a car, boat, plane, or other vehicle.

An advantage of the present invention is that a portable water-pumping system is provided that is rugged and suitable for use on a pleasure boat or while camping.

Another advantage of the present invention is that a portable pumping system is provided that can serve multiple uses in the pumping of liquids during emergencies or in routine use in the field.

A still further advantage of the present invention is that a portable pumping system is provided that can serve as a backup sump or bilge pump.

The above and still further objects, features, and advantages of the present invention will become apparent upon consideration of the following detailed description of specific embodiments thereof, especially when taken in conjunction with the accompanying drawings.

DETAILED DESCRIPTION OF THE INVENTION

Figure 1A:
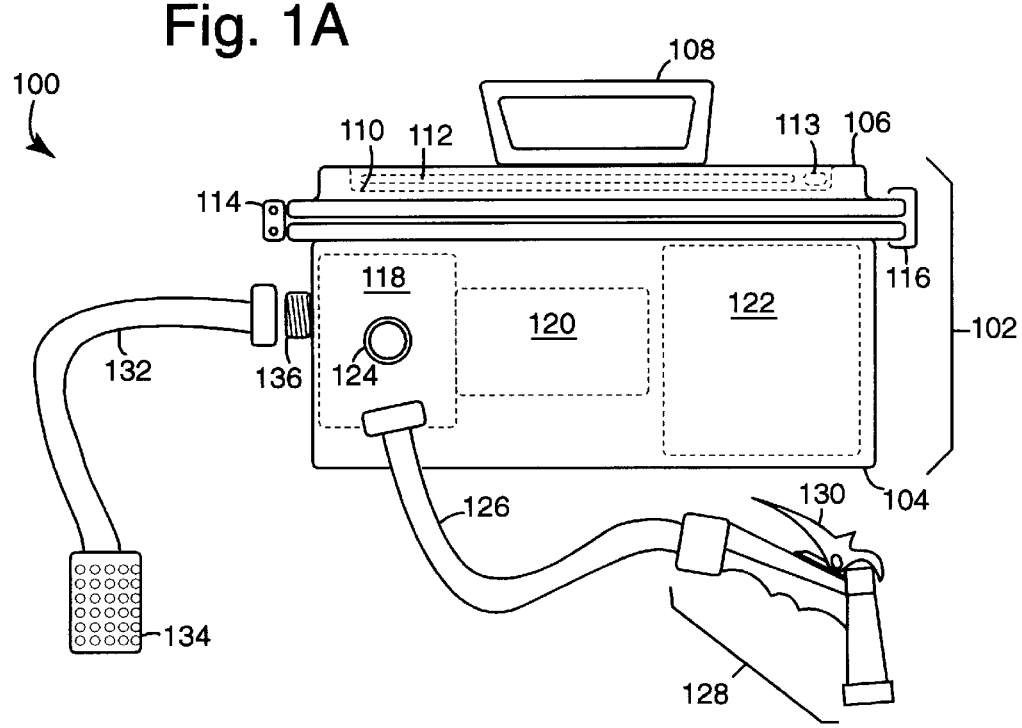
FIG. 1A is a side view of a portable water-pumping system embodiment of the present invention.
Figure 1B:
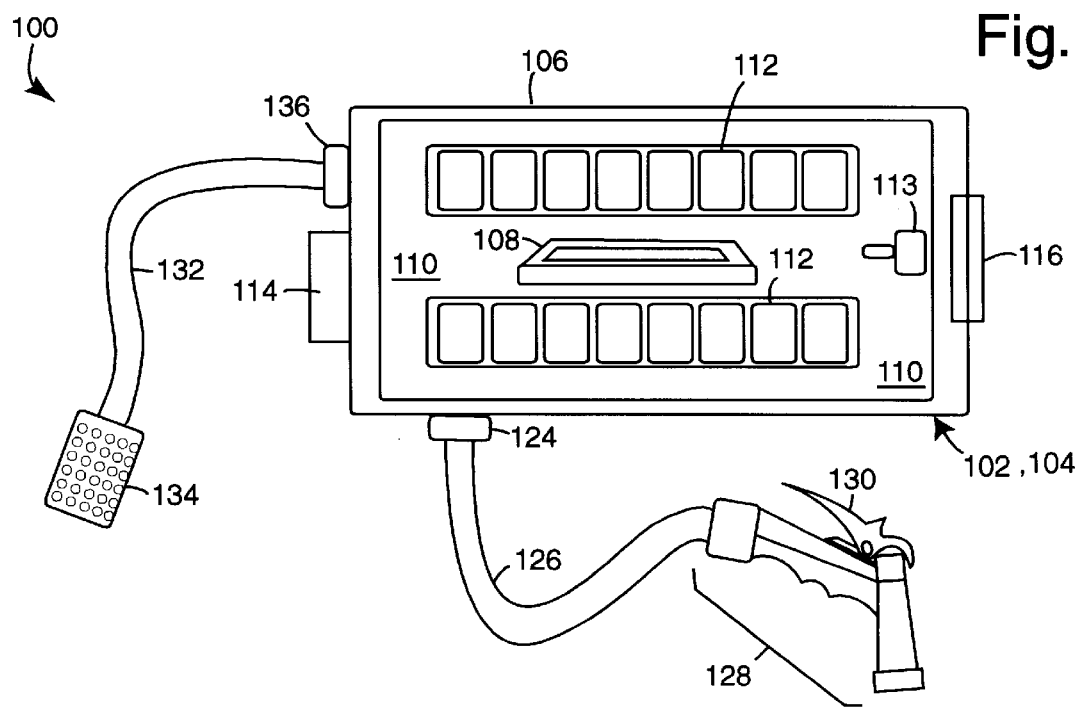
FIG. 1B is a top view of the portable water-pumping system of FIG. 1A.

FIGS. 1A and 1B illustrate a portable water-pumping system embodiment of the present invention, referred to herein by the reference numeral 100. The portable water-pumping system 100 comprises a water-tight case 102 with a bottom housing 104 and a hinged lid 106. A suitable field utility box that can be used for the water-tight case 102 is marketed by Action Products Company (Odessa, Mont.) as model number 560115. Plastic is preferred for both the bottom housing 104 and hinged lid 106 so that corrosive marine environments can be tolerated. A carrying handle 108 is attached inside a deep well 110 on the top of the lid 106. A set of photovoltaic panels 112 and an on-off switch 113 are also nested inside the well 110. A prototype that provided good results used a pair of photovoltaic panels 112 that were rated at forty milliamps @ 18VDC and was provided by Golden Genesis Photocom (Scottsdale, Ariz.) as model TJ225.

The relative placement geometries of the photovoltaic panels 112 inside the deep well 110 and the position of the carrying handle 108 are preferably such that a user can randomly lay the water-tight case 102 down on sun-lit ground and have the battery charging feature function. For this reason, it may be preferable to fix the carrying handle 108 so that it cannot layover and shadow one or the other of the photovoltaic panels 112. Alternatively, the carrying handle 108 may be located elsewhere, and not between the photovoltaic panels 112.

The "safe-harbor" position of the photovoltaic panels 112 inside the well 110 protects the relatively fragile and sometimes brittle photovoltaic devices from being damaged during normal use, transport, and storage. Very often, glass is used to package photovoltaic devices, and so ruggedizing the system requires that they be protected from normal bumps and scratches. The on-off switch 113 is preferably fitted with a rubber boot over the switch handle and the wires from the photovoltaic panels 112 are sealed to the case 102 to prevent water entry. A hinge 114 allows the lid 106 to swing wide open for service. A lockable spring clamp 116 is used to keep the lid 106 tightly shut during use. A soft rubber gasket is preferably used between the lid 106 and housing 104 to assist in preventing water entry. Alternatively, all internal wiring and circuits can be water-proofed.

A high-pressure water pump 118 is located inside the housing 104 and is mechanically driven by a 12-volt direct current pump motor 120. A prototype that provided good results used a high-pressure water pump 118 that could deliver 3.3 gallons per minute (GPM) and would shut-off automatically when the back pressure exceeded thirty-five pounds per square inch (35 PSI). The water pump and motor combination 118 and 120 are preferably self-priming, able to run without damage while dry, and includes an electric thermal overload device to protect the motor. Such a pump is marketed by FLOJET Corporation (Irvine, Calif.) as model number 4406-143, and nominally draws 3.9 amps at 12VDC. Such water pump 118 preferably delivers over thirty-five PSI at 3.3 GPM. Lesser capable pumps provide unacceptable, inferior performance in system 100.

A sealed 12VDC, 12-amp-hour, gel-cell type battery 122 operates the pump via the on-off switch 113. An acceptable way to wire together the electrical components is described in U.S. Pat. No. 5,569,998, issued Oct. 29, 1996, to Thomas Cowan. Such Patent is incorporated by reference. However, a fuse is preferably included in series with one of the battery leads to prevent any short-circuits in the pump or photovoltaic circuits from burning the internal wiring.

The photovoltaic panels 112 are connected to charge the battery 122. A diode wired in series between the photovoltaic panels 112 and the battery 122 can be included to prevent battery current from leaking back into the photovoltaic panels 112 when not charging. A solar-charge controller can also be included between the photovoltaic panels 112 and the battery 122 to prevent overcharging of the battery.

In alternative embodiments of the present invention, a 12-volt cigarette-lighter type power plug can be attached to the battery. If 120VAC utility power is available, the 12-volt cigarette-lighter type power plug can be plugged into an AC adapter. For example, a suitable AC power adapter is sold as a portable cellular-telephone battery charger by J. C. Whitney (LaSalle, Ill.) as catalog number 71BH1896U.

A high pressure outlet 124 includes a quick-release hose coupling for attachment to a pressure hose 126 and nozzle 128. An accessory quick-connect port system is marketed by FLOJET Corporation to fit with their water pumps. The FLOJET quick-connect part numbers 20381-002 and 20381-009 were used successfully. In the prototype that was built, a water nozzle with thumb slide control was used. Such thumb slide would tend to stick and needed frequent lubrication. So a water nozzle of the type illustrated in FIGS. 1A and 1B is preferred. A palm trigger 130 allows the user to switch water delivery on and off. A suitable water nozzle is marketed by Gilmour Manufacturing, Co. (Sommerset, Pa.) as the Douglas DBG-1212.

During operation, triggering the water nozzle causes changes in hydraulic backpressure. These changes, in turn are used to automatically turn the pump motor 120 on and off with a pressure-operated electrical switch. The on-off switch 113 is used principally to prevent a small water-pressure leak in the water output system from causing the pump to cycle needlessly. A suction hose 132 is reinforced to prevent collapsing and is used to draw in water through an aluminum strainer 134. A quick-release coupling 136 attaches the suction hose 132 to the inlet of the water pump 118.

The suction hose 132 or the aluminum strainer 134 itself may include filter elements that are sufficient to produce good, clean, potable drinking water from streams and lakes that may be dangerous to drink otherwise. Alternatively, such filter elements may be placed in the high pressure outlet side when the filter backpressure is too great.

Additional solar panels can be easily added to help charge a heavily used portable pumping system 100. For example, any number of secondary solar panels can be temporarily connected through a cigarette lighter cord attachment directly to the battery through a fuse.

Applications for the portable pumping system 100 include pressure washing of boats and other vehicles, bilge pumping, fresh water transfer, black water disposal, chemical transfer, pesticide and herbicide spraying, etc. On a recent test trip, a bucket of hot water was used to provide "real" showers for campers. Each of these uses would require various obvious modifications to the design and materials used in the strainer, hoses, pump, and nozzles. So the particulars of the construction of each are unnecessary to describe here.

An alternative embodiment of the present invention includes the portable water-pumping system 100 mounted to a wheeled water tank. For example, 10–30 gallon molded polyethylene tanks fitted with wheels like a cart are sold by J. C. Whitney to carry off waste water from recreational vehicles, e.g., order number 86ND5347X. The portable water-pumping system 100 is then connected to a garden hose outlet and cap provided with such tank.

Alternative embodiments of the present invention also include hot-water heating coils connected to either the inlet or outlet of the portable water-pumping system 100. For example, a length of flexible copper tubing with hose connectors on either end can be connected to the portable water-pumping system 100 and placed in a camp fire. The hot or warmed water would be useful for dish washing, showers, etc. Long lengths of black plastic tubing could be used instead and simply left to warm in the sun. The lengths of warming/heating tube needed would be dependent on the water flow used and the desired temperatures.

Although particular embodiments of the present invention have been described and illustrated, such is not intended to limit the invention. Modifications and changes will no doubt become apparent to those skilled in the art, and it is intended that the invention only be limited by the scope of the appended claims.

What is claimed is:

1. A portable pumping system, comprising:
   a plastic enclosure assembly including a plastic box and lid with a hinge, a clasp, and a single carrying handle;
   a recessed area in the top of said lid, and in which said handle is centrally disposed;
   a pair of photovoltaic panels nested in the recessed area such that they are protected from mechanical injury and are placed on opposite sides of said single handle;
   a liquid pump disposed in said box; and
   a battery connected to be charged by the photovoltaic panel and further connected to operate the liquid pump assembly;
   wherein, the relative placement geometries of the photovoltaic panels inside the recessed area and the single carrying handle are such that a user can randomly lay the plastic enclosure assembly down on any sun-lit ground and still provide for battery charging.

2. The portable pumping system of claim 1, wherein:

an inlet coupling with quick disconnects is included in a wall of said box and is hydraulically connected to a suction port of the liquid pump.

3. The portable pumping system of claim 1, wherein:

an outlet coupling with quick disconnects is included in a wall of said box and is hydraulically connected to a discharge port of the liquid pump.

4. The portable pumping system of claim 1, wherein:

the liquid pump includes a pressure switch and is capable of delivering at least 3.3 GPM at thirty-five PSI.

5. The portable pumping system of claim 1, wherein:

the plastic enclosure assembly is water-tight and provides for environmental protection of the battery and the liquid pump.

6. The portable pumping system of claim 1, further comprising:

a water nozzle and hose connected with a quick-connect coupling to a discharge port of the liquid pump.

7. The portable pumping system of claim 6, wherein:

the liquid pump includes a pressure switch such that a back-pressure caused by opening and closing the water nozzle causes the liquid pump to be electrically turned on and off automatically.

8. The portable pumping system of claim 1, further comprising:

a strainer and non-collapsible hose connected with a quick-connect coupling to a suction port of the liquid pump.

9. A portable water-pumping system, comprising:

a plastic enclosure assembly including a plastic box and lid with a hinge, a clasp, and a carrying handle;

a recessed area in the top of said lid and in which said carrying handle is centrally attached;

a pair of photovoltaic panels nested in the recessed area such that they are protected from mechanical injury, and disposed on either side of the carrying handle;

a water pump disposed in said box;

a battery connected to be charged by the photovoltaic panel and further connected to operate the water pump assembly;

an inlet coupling with quick disconnects included in a wall of said box and that is hydraulically connected to a suction port of the water pump;

a strainer and non-collapsible hose connected with a quick-connect coupling to said inlet coupling;

an outlet coupling with quick disconnects included in a wall of said box and that is hydraulically connected to a discharge port of the water pump;

a water nozzle with a single jet and control handle, and hose connected with a quick-connect coupling to said outlet coupling; and a pressure switch disposed in the water pump such that a back-pressure caused by opening and closing the water nozzle causes the water pump to be electrically turned on and off automatically;

wherein, the relative placement geometries of the photovoltaic panels inside the recessed area and the single carrying handle are such that a user can randomly lay the plastic enclosure assembly down on any sun-lit ground and still provide for battery charging.

10. The portable pumping system of claim 9, further comprising:

the plastic enclosure assembly is water-tight and provides for environmental protection of the battery and the water pump.

11. A portable water-washing system, comprising:

a plastic enclosure assembly including a plastic box and lid with a hinge, a clasp, and a carrying handle;

a recessed area in the top of said lid;

a photovoltaic panel nested in the recessed area such that it is protected from mechanical injury;

a water pump disposed in said box and for delivering a flow of at least 3.3 GPM at thirty-five PSI;

a pressure switch connected to the liquid pump;

a battery connected to be charged by the photovoltaic panel and further connected to operate the water pump assembly;

an inlet coupling with quick disconnects is included in a wall of said box and is hydraulically connected to a suction port of the water pump;

an outlet coupling with quick disconnects is included in a wall of said box and is hydraulically connected to a discharge port of the water pump;

a water nozzle and hose connected with a quick-connect coupling to a discharge port of the water pump; and a strainer and non-collapsible hose connected with a quick-connect coupling to a suction port of the water pump;

wherein, the plastic enclosure assembly is water-tight and provides for environmental protection of the battery and the water pump; and wherein the pressure switch is such that a back-pressure caused by opening and closing the water nozzle causes the water pump to be automatically turned on and off.

* * * * *